United States Patent [19]
Lee et al.

[11] Patent Number: 6,100,752
[45] Date of Patent: *Aug. 8, 2000

[54] METHOD AND APPARATUS FOR REDUCING POWER SUPPLY CURRENT SURGES IN A CHARGE PUMP USING A DELAYED CLOCK LINE

[75] Inventors: May Lee, San Jose; Lawrence D. Engh, Redwood City; Hagop Nazarian, San Jose, all of Calif.

[73] Assignee: Information Storage Devices, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/928,716

[22] Filed: Sep. 12, 1997

[51] Int. Cl.$^7$ ........................................ H03K 3/01

[52] U.S. Cl. ...................... 327/536; 327/537; 365/227; 365/226

[58] Field of Search .................................. 327/537, 536; 365/227, 226

[56] References Cited

U.S. PATENT DOCUMENTS

| | | | |
|---|---|---|---|
| 4,961,007 | 10/1990 | Kumanoya et al. | 327/537 |
| 5,180,928 | 1/1993 | Choi | 327/536 |
| 5,629,890 | 5/1997 | Engh . | |
| 5,774,012 | 6/1998 | Im | 327/536 |

Primary Examiner—Timothy P. Callahan
Assistant Examiner—An T. Luu
Attorney, Agent, or Firm—Blakely, Sokoloff, Taylor & Zafman LLP

[57] ABSTRACT

The present invention is a charge pump circuit to reduce and distribute power supply current surges. The charge pump circuit includes a first clock line to provide a first clock thereon, a plurality of delay circuits connected in series, each delay circuit generating a delayed and inverted clock from its input clock on a respective output clock line, and a plurality of charge pump stages connected in series each to store charge thereon. The first clock line is coupled to the first charge pump stage and the plurality of output clock lines are coupled to a respective plurality of remaining charge pump stages. The operation of each charge pump stage is staggered to reduce and distribute the power supply current surges.

21 Claims, 5 Drawing Sheets

METHOD AND APPARATUS FOR REDUCING POWER SUPPLY CURRENT SURGES IN A CHARGE PUMP USING A DELAYED CLOCK LINE

BACKGROUND OF THE INVENTION

1. Field of the Invention

The present invention relates to charge pumps, and methods and apparatus for reducing power supply current surges in a charge pump.

2. Description of Related Art

U.S. Pat. No. 5,629,890 to Engh relates to an integrated circuit system for analog signal storage which incorporates a read-while-write programming method. In the read-while-write programming method of the '890 patent, a high voltage ramp is applied to a memory cell to program the memory cell to a target voltage. FIG. 1 illustrates the charge pump circuit 100 that provides the high output voltage during writing/programming of a memory cell. As shown in FIG. 1, the charge pump circuit 100 includes two charge pump lines, each charge pump line having a plurality of charge pump stages $110A_1$–$110A_n$ and $110B_1$–$110B_n$, respectively. Each of the charge pump stages $110A_1$–$110A_n$ and $110B_1$–$110B_n$ includes a respective capacitor $CA_1$–$CA_n$ and $CB_1$–$CB_n$, and a respective N-channel device $MA_1$–$MA_n$ and $MB_1$–$MB_n$, each connected as a diode. A plurality of clock sources CLK1, CLK1B, CLK2, and CLK2B are provided, with alternate stages of each charge pump being connected to a common clock signal.

FIG. 2A illustrates a timing diagram of the prior art charge pump clock signals. As can be seen from the Figure, clock signals CLK1 and CLK1B, as well as clock signals CLK2 and CLK2B, are non-overlapping. Thus, clock signals CLK1 and CLK1B are never both high at the same time, and clock signals CLK2 and CLK2B are never both high at the same time. The operation of the circuit of FIG. 1 may be described as follows. (In this description, it will be assumed that the diode voltage drop of all of the diode-connected transistors in FIG. 1 is equal to $V_d$ and that the clock signals swing between zero or ground and $V_{dd}$.) When clock signal CLK1 is low, capacitor CA1 will charge to a voltage $V_{dd}$-$V_d$, where $V_d$ is the diode voltage drop of diode-connected transistor $MA_0$. When clock signal CLK1 goes high, the voltage at node $A_0$ will rise toward 2 $V_{dd}$-$V_d$. If the voltage at node A1 is presently less than 2 $V_{dd}$-2 $V_d$ (clock signal CLK1B being low), diode-connected transistor $MA_1$ will become forward biased, dumping some of the charge from capacitor $CA_1$ to capacitor $CA_2$.

On the other hand, if the voltage at node $A_1$ is just equal to 2 $V_{dd}$-2 $V_d$, diode-connected transistor $MA_2$ will be just on the threshold of conducting, though no substantial charge will be transferred from capacitor $CA_1$ to capacitor $CA_2$. When the clock signal CLK1 goes low again, diode-connected transistor $MA_1$ will be reverse biased. When clock signal CLK1B goes high, the voltage on node $A_1$ will increase from 2 $V_{dd}$-2 $V_d$ toward 3 $V_{dd}$-2 $V_d$. If at this time the voltage on node $A_2$ is less than 3 $V_{dd}$-3 $V_d$, part of the charge from capacitor $CA_2$ will be dumped into capacitor $CA_3$. If, on the other hand, the voltage on node $A_2$ is just equal to 3 $V_{dd}$-3 $V_d$, diode-connected transistor $MA_2$ will be just on the threshold of conducting, though again no substantial charge will be transferred from capacitor $CA_2$ to capacitor $CA_3$. Thus, carrying out this analysis to the limit, it may be seen that for n charge pump stages, the charge pump voltage limit for an unloaded (open circuit) charge pump output will be equal to $N(V_{dd}$-$V_d)$.

For any real load on the charge pump, output capacitor $CA_n$ and $CB_n$ will discharge somewhat between pumping cycles to provide the output current into the load, in which case each stage of the two charge pump lines will pump charge toward the output at a rate dependent upon the charge pump output current. Accordingly, the charge pump circuit will appear as a voltage source with a source impedance inversely proportional to the size of the capacitors times the frequency of the clock signals.

In the read-while-write programming method, a read operation is simultaneously performed while the memory cell is being programmed to determine when to terminate the application of the high voltage (i.e., when the target voltage is reached). Since the reading occurs during the writing operation, the charge pump circuit 100 of FIG. 1 is active when the voltage stored on the cell is being read back. Depending on the number of charge pump stages, the loading on each of the clock drivers of the prior art is relatively large, being proportional to (n*C)/2, where n is the number of charge pump stages and C is the value of each capacitor. Driving a large load requires a large clock driver, which in turn increases the demand on the power supply. Large demands on the power supply cause current surges which cause undesirable disturbances in the system. FIG. 2B schematically illustrates the current surges on the power supply with reference to clocks CLK1, CLK1B, CLK2, and CLK2B.

The large current surges can result in inaccurate reading of the memory cell in the read-while-write programming method. As a result, the memory cell may be underprogrammed or overprogrammed. Also with the prior art charge pump, additional circuitry is needed to ensure that clocks CLK1 and CLK1B are non-overlapping and clocks CLK2 and CLK2B are non-overlapping. Further, as the demand continues for smaller die sizes, new design techniques and system implementations are needed to reduce the die area for any intended function.

Accordingly, there is a need in the art for an apparatus and method of providing a high voltage charge pump that outputs a high voltage while reducing instantaneous power supply current surges and reducing the overall size of the circuit.

SUMMARY OF THE INVENTION

The present invention is a charge pump circuit to reduce and distribute power supply current surges. The charge pump circuit includes a first clock line to provide a first clock thereon, a plurality of delay circuits connected in series, each delay circuit generating a delayed and inverted clock from its input clock on a respective output clock line, and a plurality of charge pump stages connected in series each to store charge thereon. The first clock line is coupled to the first charge pump stage and the plurality of output clock lines are coupled to a respective plurality of remaining charge pump stages. The operation of each charge pump stage is staggered to reduce and distribute the power supply current surges.

BRIEF DESCRIPTION OF THE DRAWINGS

The features and advantages of the present invention will become apparent from the following detailed description of the present invention in which.

DESCRIPTION OF THE PREFERRED EMBODIMENT

Figure 1:
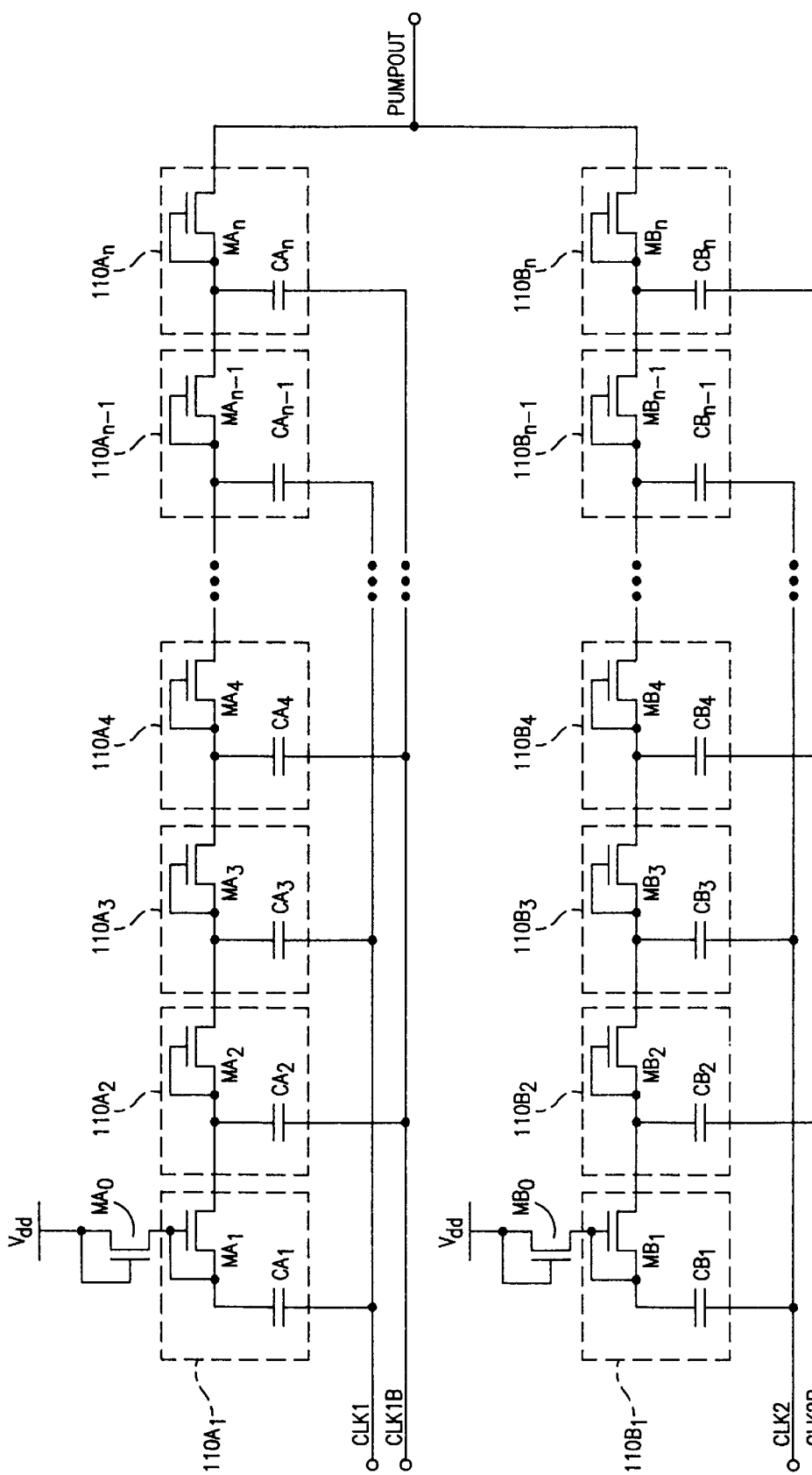
FIG. 1 illustrates a prior art charge pump circuit.
Figure 2A:
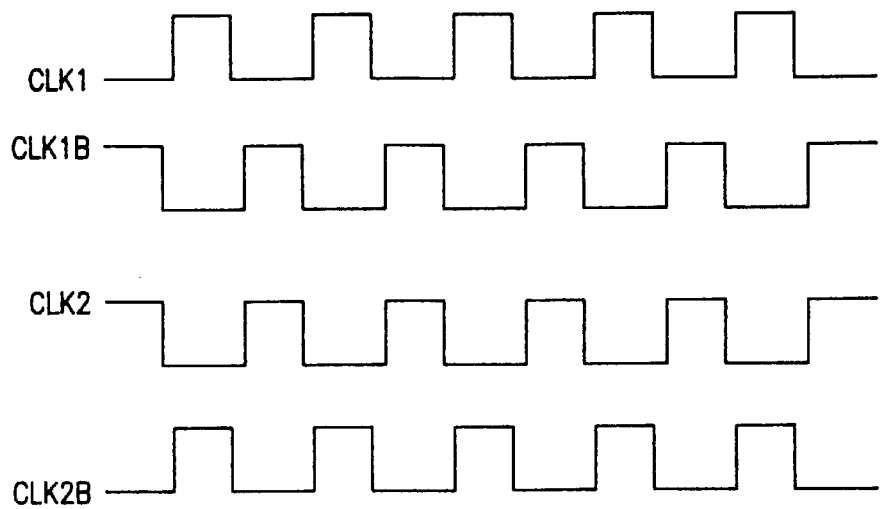
FIG. 2A illustrates a timing diagram of the prior art charge pump clock sources.
Figure 2B:
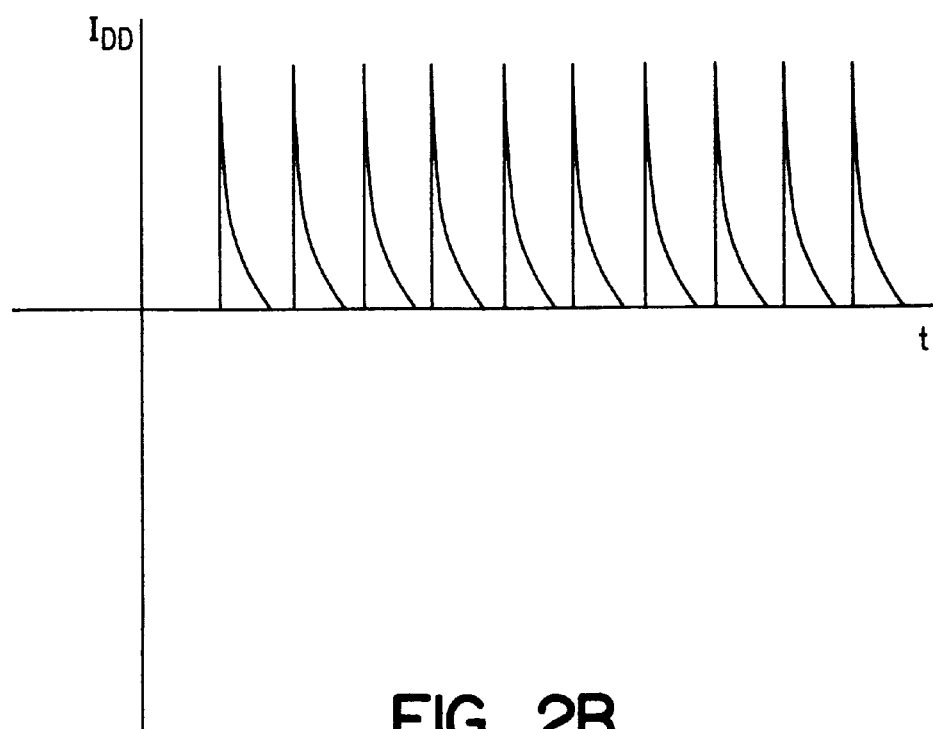
FIG. 2B illustrates the power supply current surges of the prior art charge pump circuit.
Figure 3A:
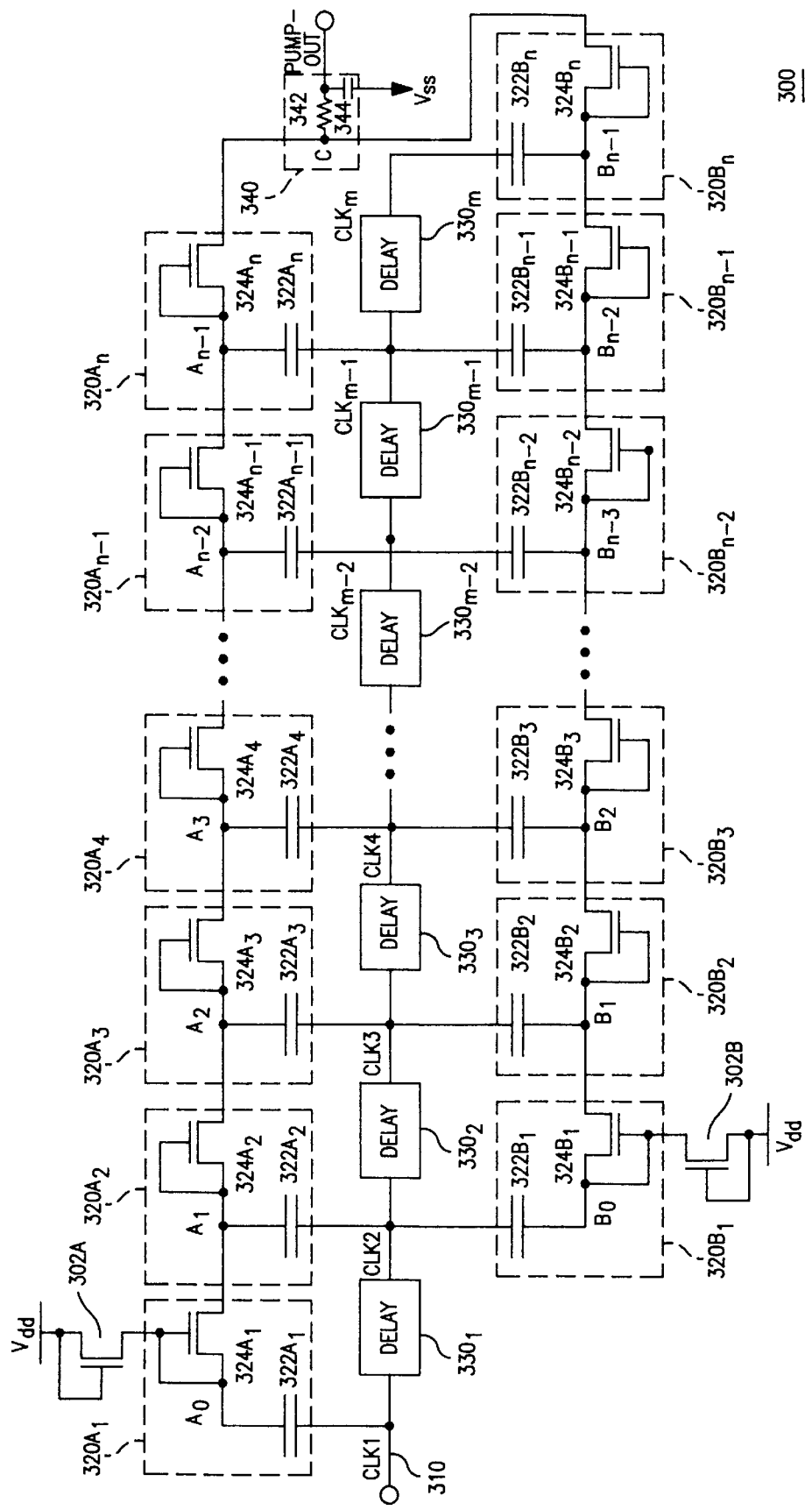
FIG. 3A illustrates one embodiment of the charge pump circuit of the present invention.

First referring to FIG. 3A, the preferred embodiment of the charge pump circuit 300 of the present invention may be seen. The charge pump circuit 300 includes a clock signal line 310 that provides a clock signal CLK1, first and second charge pumps or charge pump lines, each comprising a series of charge pump stages $320A_1$–$320A_n$ and $320B_1$–$320B_n$, respectively, a plurality of identical inverting delay clock circuits $330_1$–$330_m$, and a low pass filter circuit 340 to provide a filtered output, PUMPOUT, of the charge pump circuit. Each stage of the first charge pump lines $320A_1$–$320A_n$ includes one capacitor $322A_1$–$322A_n$ and one N-channel device $324A_1$–$324A_n$, each of which is diode-connected. Similarly, each stage of the second charge pump lines $320B_1$–$320B_n$ includes one capacitor $322B_1$–$322B_n$ and one N-channel device $324B_1$–$324B_n$, each of which is also diode-connected.

Figure 3B:
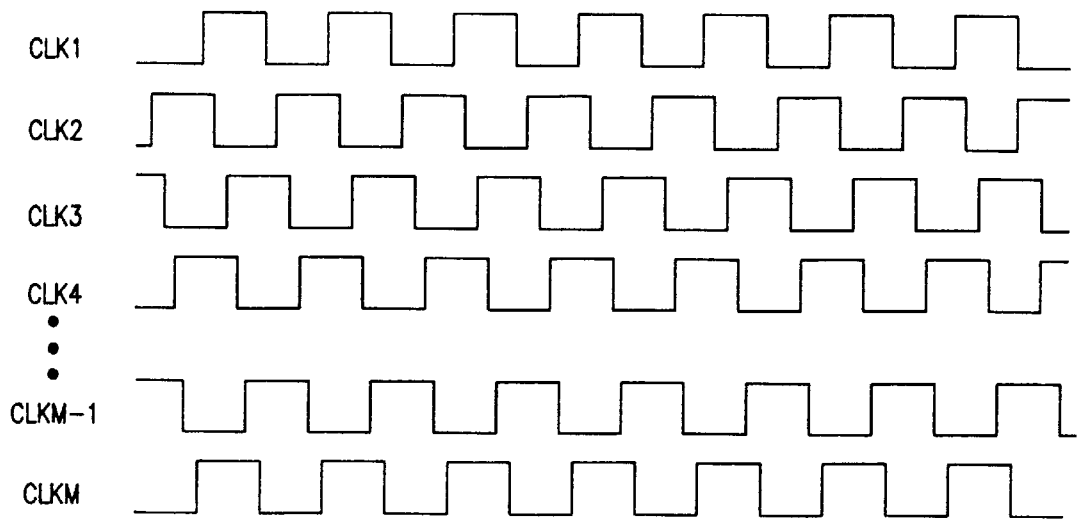
FIG. 3B illustrates a timing diagram for the clock signals used in the preferred embodiment charge pump circuit of the present invention.

As may be seen in FIG. 3A, charge pump stage $320A_1$ is driven by the clock signal CLK1. Charge pump stages $320A_2$ and $320B_2$ are driven by clock signal CLK2, delayed and inverted by delay $330_1$ with respect to clock signal CLK1. Each stage of the series of stages in the upper charge pump line is similarly driven as successively delayed and inverted clock signals, as is illustrated in FIG. 3B. The lower series of charge pump stages shown in FIG. 3A are also driven by clock signals each delayed and inverted with respect to the clock signal driving the prior stage of the charge pump line. The first stage $320B_1$ of the lower charge pump line, however, is driven not by the clock signal CLK1 but rather by the delayed and inverted clock signal CLK2, so that whatever happens in the upper charge pump line will similarly happen in the lower charge pump line, though time delayed with respect thereto.

In operation under a normal load, first assume the clock signal CLK1 is low, as shown in FIG. 3B. Capacitor $322A_1$ will charge through diode-connected transistor 302A to the voltage $V_{dd}$-$V_d$. Then when the clock signal CLK1 goes high, node $A_0$ will be encouraged toward the voltage 2 $V_{dd}$-$V_d$. As may be seen from FIG. 3B, at this time the delayed and inverted clock signal CLK2 will still be high. Unless the voltage of node $A_1$ at this time is less than 2 $V_{dd}$-2 $V_d$, diode-connected transistor $324A_1$ will not be forward biased and no charge will be transferred from capacitor $322A_1$ to capacitor $322A_2$. However, when the delayed and inverted clock signal CLK2 then goes low, diode-connected transistor $324A_1$ will become forward biased and part of the charge on capacitor $322A_1$ will be transferred to capacitor $322A_2$, raising the voltage of node $A_1$.

Similarly, when the delayed and inverted clock signal CLK2 goes high again, the voltage at node $A_1$ will be encouraged further upward by an increment $V_{dd}$. At this time, the further delayed and inverted clock signal CLK3 will still be high, and again unless the voltage at node $A_2$ is now less than the then existing voltage at node $A_1$ by at least $V_{dd}$, no part of the charge will be transferred from capacitor $322A_2$ to capacitor $322A_3$. However, when the further delayed and inverted clock signal CLK3 goes low, diode-connected transistor $324A_2$ will become forward biased and part of the charge from capacitor $322A_2$ will be transferred to capacitor $322A_3$, raising the voltage of node $A_3$.

Since in the steady state the average voltage at each of the nodes $A_0$ through $A_{n-1}$ doesn't change, it is apparent that the charge transferred from capacitor $322A_1$ to capacitor $322A_2$ on a charge pumping cycle of stage $320A_1$ will be equal to the charge transferred from capacitor $322A_2$ to capacitor $322A_3$ on a charge pumping cycle of stage $320A_2$, etc. However, these charge pumping cycles for each stage of the n stages of the upper charge pump line of FIG. 3A are delayed, one to another, or staggered, so that the current spike loads on the power supply for generating the clock signals are similarly staggered (see FIGS. 3C and 3D). In particular, in the prior art, given the two interleaved charge pump lines, each having n stages, each clock signal would drive n capacitors at a time. In comparison, only two capacitors are driven at a time in the circuit of FIG. 3A, the driving of all 2n capacitors being spread out over n time increments, wherein each time increment equals the delay of one of the delay circuits 330. Consequently, while the circuit of FIG. 3A might, for instance, operate at the same clock frequency (preferably higher) as that of the prior art, the instantaneous loading on the power supply is greatly reduced and the frequency of the power supply current ripple is substantially increased, making the filtering of the ripple easier and more effective.

Referring again to FIG. 3A, it may be seen that when the clock signal CLK1 goes low, whatever charge had been transferred to capacitor $322A_2$ from capacitor $322A_1$, now lowering the voltage of capacitor $322A_1$ to below $V_{dd}$-$V_d$, will be replenished from the power supply through diode-connected transistor 302A. Accordingly, while the pumping action resulting from any clock signal going high puts a load on the power supply to drive that clock signal, the replenishment of the charge on capacitor $322A_1$ will also put some load on the power supply when the clock signal CLK1 goes low. While the first stage $322B_1$ of the lower charge pump line could have been driven by the signal CLK1, the staggering and inverting of the drive of this stage also avoids the simultaneous replenishment of the charge of capacitors $322A_1$ and $322B_1$ in preparation for the next charge pumping operation. This, too, reduces the magnitude of the current spikes on the power supply. The inverting of the charge pump line starting signals also interleaves the output of the charge pump lines, reducing the output ripple voltage and increasing its frequency for easier filtering.

Figure 4:
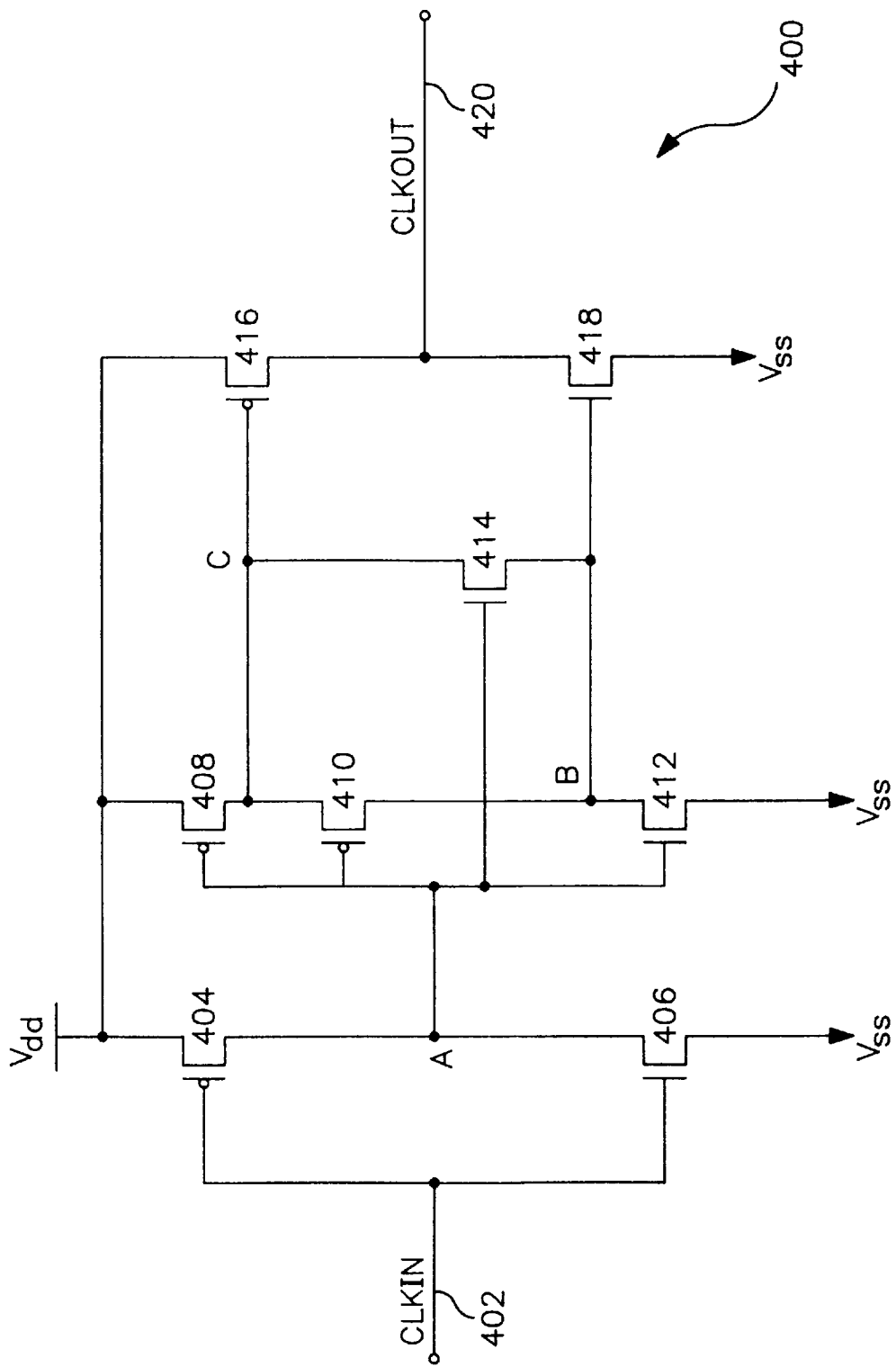
FIG. 4 illustrates one embodiment of the delay circuit used in the preferred embodiment of the present invention.

FIG. 4 illustrates one embodiment of the delay circuit 400 of the present invention. Referring to FIG. 4, the delay circuit 400 includes P-channel MOS devices 404, 408, 410 and 416 and N-channel MOS devices 406, 412, 414 and 418. The delay circuit 400 receives an input clock signal CLKIN on an input signal line 402, delays the input clock signal CLKIN by a predetermined amount of time, and provides an inverted output clock signal CLKOUT on an output signal line 420. More specifically, when the input clock signal CLKIN goes low, N-channel device 406 turns off and P-channel device 404 turns on, causing node A to be pulled high to $V_{dd}$. With node A at $V_{dd}$, P-channel devices 408 and 410 turn off and N-channel devices 412 and 414 turn on.

With N-channel device 412 turned on, node B is pulled down to $V_{ss}$ and causes N-channel device 418 to turn off. With N-channel device 414 turned on, node C is also pulled down to the voltage at node B which is $V_{ss}$. This causes P-channel device 416 to turn on. As such, the output clock signal CLKOUT is pulled high to $V_{dd}$. N-channel device 414 assures that transistor 418 turns off before transistor 416 turns on, preventing both transistors from being on momentarily during the switching.

Conversely, if the input clock signal CLKIN goes high, P-channel device 404 turns off and N-channel device 406 turns on, causing node A to be pulled low to $V_{ss}$. With node A at 0 volts (or close to 0 volts), N-channel devices 412 and 414 are turned off and P-channel devices 408 and 410 are turned on. With both P-channel devices 408 and 410 on, node B is first pulled high to $V_{dd}$, thus causing P-channel device 416 to turn off. Thereafter, node B is pulled high to $V_{dd}$, thereby causing N-channel device 418 to turn on. With N-channel device 418 turned on, the output clock signal CLKOUT is pulled low to $V_{ss}$. Now, P-channel device 410 assures that transistor 416 turns off before transistor 418 turns on, again preventing both transistors from being on momentarily during the switching. Thus, the delay circuit 400 inverts and delays an input clock signal as stated.

In the preferred embodiment, the delay circuits $330_1$–$330_M$ are analog delay and inverting circuits, specifically successive inverter type circuits which merely impose a delay based upon the response time of the circuit. In other embodiments, however, the clock signal CLK1 might be digitally generated, such as by way of example, dividing down a frequency n times the clock frequency CLK1, with each count of the higher frequency initiating the next successive delayed and inverted clock cycle. In this way, the M delayed and inverted clock signals may be equally staggered throughout the cycle time of one clock cycle CLK1 to maximize the smoothing effect of the present invention. Further, in such an embodiment, the charge pump stage $320B_1$ might be driven from the delayed clock signal $CLK_{M/2}$, with each subsequent stage being driven by the next subsequent delayed and inverted clock signal, using wrap-around to provide the full series of M delayed and inverted clock cycles. Such an embodiment would both equally stagger the replenishment of the charge on capacitors $322A_1$ and $322B_1$ and equally stagger the pumping of the two charge pump lines to the output filter and load. However, the reduction in the power supply current spikes beyond that of the preferred embodiment disclosed would not be substantial.

Figure 3C:
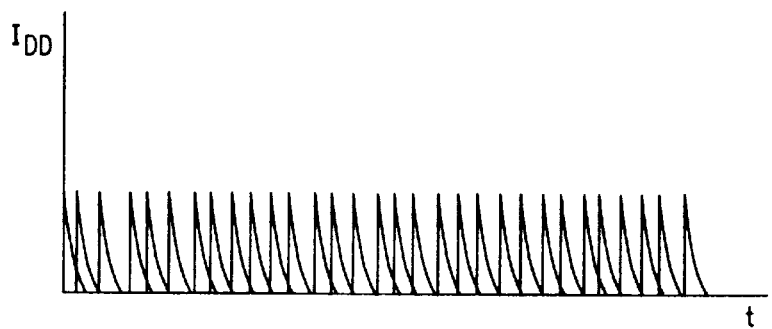
FIG. 3C illustrates individual driver current surges on the power supply of the charge pump circuit of the present invention.
Figure 3D:
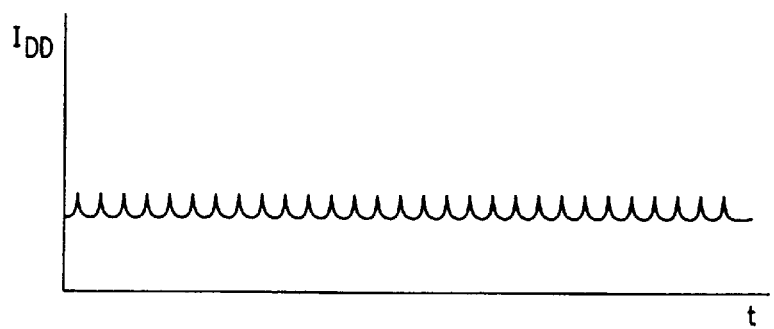
FIG. 3D illustrates combined driver current surges on the power supply of the charge pump circuit of the present invention.

As pointed out previously, each clock signal generated by a delay circuit is inverted and delayed with respect to the input to the delay circuit. (Preferably, the total delay imposed by the combination of all delay circuits is at least one-half the period of clock signal CLK1 for best performance.) As a result, not only are the current supply surges distributed over time, but the load on each clock driver (i.e., delay circuit) is small, so that the clock drivers may be small. Also, any switching current required by the delay circuits is spread out over time. Thus, the amplitude of the power supply current surges is small, and at a higher frequency, as shown in FIGS. 3C and 3D. This is to be distinguished from the prior art where large, lower frequency power supply current surges occur when the clock drivers are switching, and of course, the prior art clock drivers had to be large to drive the larger capacitive loads.

As a result of the foregoing, the present invention provides a quieter system over the prior art, and alleviates the problem with the prior art of underprogramming or overprogramming a memory cell during the read-while-write programming method. In addition, the prior art charge pump circuit requires circuitry for ensuring that clocks CLK1 and CLK1B are non-overlapping as well as CLK2 and CLK2B, as opposed to the present invention where no such circuit is needed.

To further reduce the area of the charge pump circuit 300 of FIG. 3A, the capacitors are made smaller and the clock frequency is increased, as the capacitance value of each capacitor is inversely proportional to the clock frequency for the same pumping capacity. This in turn requires still smaller delay clock drivers to drive the smaller capacitors. Increasing the clock frequency and decreasing the capacitor size increases the frequency of the output voltage ripple and decreases the amplitude of the output ripple, making the filtering of the charge pump output by resistor 342 and capacitor 344 easier and more effective.

With the present invention, the current surges on the power supply are reduced and distributed due to smaller clock drivers and smaller loads. Moreover, through the use of increased clock frequency and smaller capacitors, the overall size of the circuit is further reduced. This also reduces the output ripple, and provides for a quieter system and enhanced system performance.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may readily occur to those ordinarily skilled in the art.

What is claimed is:

1. A charge pump circuit, comprising:

a first charge pump diode having a first terminal coupled to a power supply terminal, and a second terminal;

a clock terminal having a first clock signal thereon;

a first charge pump circuit including a first capacitor and a first diode, the first capacitor having a first terminal coupled to the clock terminal and a second terminal coupled to the second terminal of the charge pump diode, the first diode having a first terminal coupled to the second terminal of the first capacitor, and a second terminal;

a delay circuit having a first terminal coupled to the clock terminal, and a second terminal, said delay circuit to generate a second clock signal on the second terminal that is delayed and inverted from the first clock signal;

a second charge pump circuit including a second capacitor and a second diode, the second capacitor having a first terminal coupled to the second terminal of the delay circuit and a second terminal coupled to the second terminal of the first diode, the second diode including a first terminal coupled to the second terminals of the second capacitor and the first diode, and a second terminal;

a second charge pump diode having a first terminal coupled to the power supply terminal, and a second terminal; and a third charge pump circuit including a third capacitor and a third diode, the third capacitor having a first terminal coupled to the second terminal of the delay circuit and a second terminal coupled to the second terminal of the second charge pump diode, the third diode including a first terminal coupled to the second terminal of the third capacitor, and a second terminal.

2. The charge pump circuit of claim 1 wherein the second terminal of the second diode is coupled the second terminal of the third diode.

3. The charge pump circuit of claim 2 wherein when said first clock signal is active and said second clock signal is inactive, a portion of charge on the first capacitor is transferred to said second capacitor through the first diode.

4. The charge pump circuit of claim 2 wherein when said first clock signal is inactive, the first capacitor is charged from the power supply terminal through the first charge pump diode.

5. The charge pump circuit of claim 1 further comprising:
a second delay circuit including a first terminal coupled to the second terminal of the delay circuit, and a second terminal, said second delay circuit to generate a third clock signal on the second terminal that is delayed and inverted from the second clock signal; and
a fourth charge pump circuit including a fourth capacitor and a fourth diode, the fourth capacitor having a first terminal coupled to the second terminal of the second delay circuit, and a second terminal coupled to the second terminal of the third diode, the fourth diode including a first terminal coupled to the second terminals of the fourth capacitor and the third diode, and a second terminal.

6. The charge pump circuit of claim 5 wherein when said second clock signal is active and said third clock signal is inactive, a portion of charge on the third capacitor is transferred to said fourth capacitor through the third diode.

7. The charge pump circuit of claim 5 wherein each diode comprises a N-channel device that is configured as a diode.

8. The charge pump circuit of claim 5 wherein when said second clock signal is inactive, the third capacitor is charged from the power supply terminal through the second charge pump diode.

9. The charge pump circuit of claim 2 wherein each diode comprises a N-channel device that is configured as a diode.

10. The charge pump circuit of claim 2 further including a low pass filter coupled between an output terminal and the second terminals of the second and third diodes.

11. The charge pump circuit of claim 10 wherein the low pass filter comprises an output capacitor and a resistor coupled to the output capacitor.

12. The charge pump circuit of claim 5 wherein the second terminal of the second diode is coupled the second terminal of the fourth diode.

13. The charge pump circuit of claim 12 further including a low pass filter coupled between an output terminal and the second terminals of the second and fourth diodes.

14. The charge pump circuit of claim 13 wherein the low pass filter comprises an output capacitor and a resistor coupled to the output capacitor.

15. A charge pump circuit for reducing power supply current surges, comprising:
first and second charge pump diodes each having a first terminal coupled to a power supply terminal, and a second terminal;
a clock terminal having a first clock signal thereon;
N delay circuits coupled in series each having an input terminal and an output terminal, a first of the N delay circuits having its input terminal coupled to the clock terminal, each delay circuit generating a delayed and inverted clock signal on its respective output terminal; and a first set of N charge pump stages each having an input terminal and an output terminal, each charge pump stage including,
a capacitor having a first terminal coupled to the input terminal, and a second terminal,
a diode having a first terminal coupled to the second terminal of the capacitor, and a second terminal coupled to the output terminal,
the input terminal of the first charge pump stage being coupled to the clock terminal, the second terminal of the capacitor in the first charge pump stage being coupled to the second terminal of the charge pump diode, the output terminals of a first N-1 delay circuits being coupled to the input terminals of a last N-1 respective charge pump stages, and the output terminals of the first N-1 charge pump stages being coupled to the second terminals of the capacitor of the last N-1 respective charge pump stages; and
a second set of N charge pump stages each having an input terminal and an output terminal, each charge pump stage in the second set of N charge pump stages including,
a capacitor having a first terminal coupled to the input terminal, and a second terminal, and
a diode having a first terminal coupled to the second terminal of the capacitor, and a second terminal coupled to the output terminal,
the second terminal of the capacitor in the first charge pump stage being coupled to the second terminal of the second charge pump diode, the output terminals of the N delay circuits being coupled to the input terminals of the respective N charge pump stages, and the output terminal of the first N-1 charge pump stage being coupled to the second terminal of the capacitor of the last N-1 respective charge pump stages;
wherein N is at least one.

16. The charge pump circuit of claim 15 wherein charge is transferred from one charge pump stage to a next charge pump stage when a first clock signal at the input terminal of the one charge pump stage is active and a second clock at the input terminal of the next charge pump stage is inactive.

17. The charge pump circuit of claim 15 wherein each diode comprises a N-channel device connected as a diode.

18. The charge pump circuit of claim 15 further including a low pass filter circuit coupled to the output terminals of the last charge pump stages in the first and second set of charge pump stages.

19. The charge pump circuit of claim 15 wherein a total delay imposed by the N delay circuits is at least one-half of a period of the first clock signal.

20. The charge pump circuit of claim 15 wherein the output terminal of the Nth charge pump stage in the first set of charge pump stages being coupled to the output terminal of the Nth charge pump stage in the second set of charge pump stages.

21. The charge pump circuit of claim 20 further comprising a low pass filter coupled between a pump out terminal and the output terminals of the Nth charge pump stages in the first and second set of charge pump stages.

* * * * *